United States Patent
Goli (12)

(10) Patent No.: US 10,667,220 B2
(45) Date of Patent: May 26, 2020

(54) SYSTEM AND METHOD FOR ADJUSTING POWER IN A WIRELESS SENSOR

(71) Applicant: Carrier Corporation, Palm Beach Gardens, FL (US)

(72) Inventor: Santhosh Reddy Goli, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/307,237

(22) PCT Filed: May 17, 2017

(86) PCT No.: PCT/US2017/033167
§ 371 (c)(1),
(2) Date: Dec. 5, 2018

(87) PCT Pub. No.: WO2017/213815
PCT Pub. Date: Dec. 14, 2017

(65) Prior Publication Data
US 2019/0306804 A1   Oct. 3, 2019

Related U.S. Application Data

(60) Provisional application No. 62/346,654, filed on Jun. 7, 2016.

(51) Int. Cl.
*H04B 1/38*   (2015.01)
*H04W 52/24*   (2009.01)
(Continued)

(52) U.S. Cl.
CPC ....... *H04W 52/242* (2013.01); *H04W 52/241* (2013.01); *H04W 52/245* (2013.01);
(Continued)

(58) Field of Classification Search
CPC ............ H04W 52/242; H04W 52/241; H04W 52/245; H04W 1/72522; H04W 88/02; H04M 1/72519
(Continued)

(56) References Cited

U.S. PATENT DOCUMENTS 6,208,247 B1   3/2001   Agre et al.
6,727,816 B1   4/2004   Helgeson
(Continued)

FOREIGN PATENT DOCUMENTS

CN   202422143 U   9/2012
WO   2016003744 A1   1/2016

OTHER PUBLICATIONS

Bhuvaneswari, P.T.V., et al., "Optimal transmission power selection under energy constraints for sensor network localization", abstract, 2010 11th International Conference on Control Automation Robotics & Vision, Dec. 7-10, 2010, 1 page.
(Continued)

*Primary Examiner* — Danh C Le
(74) *Attorney, Agent, or Firm* — Cantor Colburn LLP

(57) ABSTRACT

A system for RF transmission power adjustment in a wireless sensor is provided. The system includes a main control unit positioned within an environment. At least one sensor is positioned within the environment and constructed and arranged to monitor occurrences within the environment. The at least one sensor is in wireless communication with the main control unit. The at least one sensor sends signals to the main control unit indicative of the occurrences. The signals have communication parameters affected by an environmental condition of the environment. The main control unit regulates a RF transmission power of the at least one
(Continued)

sensor based on at least one of an aggregate of communication parameters of the signal or the environmental condition.

18 Claims, 9 Drawing Sheets

(51) Int. Cl.
  *H04W 52/14* (2009.01)
  *H04M 1/725* (2006.01)
(52) U.S. Cl.
  CPC .... *H04M 1/72519* (2013.01); *H04M 1/72522* (2013.01); *H04W 52/146* (2013.01)
(58) Field of Classification Search
  USPC .............................. 455/574, 522, 550.1, 418
  See application file for complete search history.

(56) References Cited

U.S. PATENT DOCUMENTS

| | | | |
|---|---|---|---|
| 8,547,982 B2 | 10/2013 | Sultan et al. | |
| 9,438,868 B2* | 9/2016 | Boettiger | H04N 9/09 |
| 10,212,667 B1* | 2/2019 | Govindassamy | H04W 52/0258 |
| 10,306,563 B1* | 5/2019 | Rajendran | H04W 52/226 |
| 2007/0253352 A1 | 11/2007 | Arisha et al. | |
| 2008/0136708 A1 | 6/2008 | Kim et al. | |
| 2009/0015196 A1* | 1/2009 | Baxter | H02J 5/005 320/108 |
| 2009/0168677 A1 | 7/2009 | Kang et al. | |
| 2010/0142425 A1 | 6/2010 | Lee et al. | |
| 2011/0057812 A1* | 3/2011 | Matsuda | G05B 19/406 340/870.07 |
| 2014/0372775 A1 | 12/2014 | Li et al. | |
| 2014/0375274 A1* | 12/2014 | Tsai | H04L 12/10 320/137 |
| 2014/0378177 A1* | 12/2014 | Muraoka | H04W 16/14 455/501 |
| 2016/0059723 A1* | 3/2016 | Kim | B60L 53/37 320/108 |
| 2016/0118818 A1* | 4/2016 | Yamauchi | H02J 7/007 320/152 |
| 2016/0132099 A1* | 5/2016 | Grabau | G06K 9/00771 713/323 |
| 2016/0286502 A1* | 9/2016 | Sugitani | H04W 52/16 |
| 2016/0353184 A1* | 12/2016 | Sindia | H04Q 9/00 |
| 2016/0359325 A1* | 12/2016 | Kawata | G16Q 40/67 |
| 2017/0013242 A1* | 1/2017 | Fujiwara | H04N 9/735 |
| 2017/0188438 A1* | 6/2017 | Vollmer | H05B 37/0254 |
| 2017/0234818 A1* | 8/2017 | Jesme | A61B 5/443 374/54 |
| 2019/0260409 A1* | 8/2019 | Ban | G01R 29/08 |

OTHER PUBLICATIONS

Boaventura, Alírio Soares, et al., "A proposal for dynamic power control in RFID and Passive Sensor Systems based on RSSI", abstract, 2012 6th European Conference on Antennas and Propagation (EUCAP), Mar. 26-30, 2012, 1 page.

Coca, Eugen, et al., "Wireless Sensor Network nodes performance measurements and RSSI evaluation", abstract, 2009 15th International Symposium for Design and Technology of Electronics Packages (SIITME), Sep. 17-20, 2009, 2 pages.

International Search Report and Written Opinion for application PCT/US2017/033167, dated Jul. 17, 2017, 20 pages.

Khemapech, I., et al., "A Survey of Transmission Power Control in Wireless Sensor Networks", University of St Andrews North Haugh, St Andrews, Fife, KY16 9SX, Jul. 10, 2007, 6 pages.

Liao, Wen-hwa, et al., "Localization with Power Control in Wireless Sensor Networks" abstract, 2006 International conference on Systems and Networks Communications, Oct. 29-Nov. 3, 2006, 1 page.

Ren, Hongliang, et al., "Node localization during power adjustment in wireless sensor networks", abstract, 2009 IEEE International Conference on Robotics and Automation, May 12-17, 2009, 1 page.

Rukpakavong, Wilawan, et al., "Neighbour Discovery for Transmit Power Adjustment in IEEE 802.15.4 Using RSSI", abstract, 2011 4th IFIP International Conference on New Technologies, Mobility and Security, Feb. 7-10, 2011, 1 page.

Vijayakumar, Prashanth et al., "Power Allocation and Scheduling in Practical Implemenations of Wireless Network Coding", 2014 IEEE Operations and Management Symposium, May 5, 2014, 6 pages.

\* cited by examiner

SYSTEM AND METHOD FOR ADJUSTING POWER IN A WIRELESS SENSOR

CROSS REFERENCE TO RELATED APPLICATION

The present application is an international patent application, which claims the priority benefit of U.S. Application Ser. No. 62/346,654, filed Jun. 7, 2016, which is herein incorporated in its entirety.

TECHNICAL FIELD OF THE DISCLOSED EMBODIMENTS

The presently disclosed embodiments generally relate to wireless sensors, and more particularly, to a system and method of adjusting RF transmission power within a wireless sensor.

BACKGROUND OF THE DISCLOSED EMBODIMENTS

Generally, remote sensors located within an environment transmit information and measurements of sensing occurrences in the environment to a main control unit. In residential, commercial, and industrial environments the remote sensors are static i.e. the remote sensors are fixed at a location in which it can best detect occurrences like temperature, humidity, environmental gases, carbon monoxide, carbon dioxide, motion, glass break, door open, or security alarm, fire, occupancy, light, ultraviolet light, passive infrared, motion, water level, oxygen, volatile organic compounds, air flow, water flow, pressure, or sound, but not limited to these occurrences. Remote sensors detect these occurrences and transmit the information over wired or wireless interfaces.

Wireless remote sensors are generally powered by a power line or battery. Wireless remote sensors generally operate part of the time in a sleep or inactive state partly detecting occurrences which it is intended to sense. The common activities involved in sensing may be wakeup, sense, process, and transmit and receive information via radio-frequency transmission. The battery power consumption of the remote wireless sensor are generally dependent on the transmit and receive activities, the duration of the message and the radio frequency (RF) transmission power level of the radio-frequency energy to be transmitted. The radio-frequency transmit field strength is normally represented in decibel-milliwatts. In the case of a wireless remote sensor running on a battery, the transmit time and RF transmission power level has an impact on the lifespan of the battery. Typically, the RF transmission power is directly proportional to the range in which the wireless remote sensor can transmit information.

The wireless remote sensor is typically factory programmed to a maximum RF transmission power level to achieve a maximum range, or is factory programmed to a RF transmission power level which will achieve a stipulated range of the sensor. For example, to achieve a maximum range of 100 meters, a wireless remote sensor may be required to transmit the message over its radio-frequency at 5 decibel-milliwatts. The remote sensor will be factory programmed to transmit at 5 decibel-milliwatt RF transmission power level. Accordingly, all wireless remote sensors, regardless of their level of proximity to a main control unit, consume the same amount of battery power to communicate with the main control unit.

In most environments, the main control unit is the one which controls the end equipment based the on the data received from the sensors. The wireless remote sensors are arranged one or more in a zone. There may be multiple zones in the environment. For the wireless remote sensors which operate on batteries, the RF transmission power of the wireless remote sensor has an impact on the life of the battery. Typically, the transmit power of the wireless sensor is already programmed to max value. While the sensors located at the edge of the range have to transmit messages at the max value of the RF transmission power, even sensors located close to the main control unit will transmit at this max value of RF transmission power level as they are factory programmed to do so. If a sensor is out of range, a repeater, range extender, aggregator or protocol conversion device is used to communicate the data sent by the wireless sensor. Additionally, obstructions in the environment may create path loses of some sensors. Because all of the sensors are factory pre-programmed to operate at a predetermined RF transmission power level, some sensors may waste battery power, thereby draining the battery of the sensor.

A need remains for a system that controls the RF transmission power level of a wireless remote sensor at an optimum RF transmission power level that saves battery power.

SUMMARY OF THE DISCLOSED EMBODIMENTS

In one aspect, a system for RF transmission power adjustment in a wireless sensor is provided. The system includes a main control unit positioned within an environment. At least one sensor is positioned within the environment and constructed and arranged to monitor occurrences within the environment. The at least one sensor is in wireless communication with the main control unit. The at least one sensor sends signals to the main control unit indicative of the occurrences. The signals have communication parameters affected by an environmental condition of the environment. The main control unit regulates a RF transmission power of the at least one sensor based on at least one of an aggregate of the communication parameters of the signal or the environmental condition.

In a further aspect of the above, a hub receives the signal from the at least one sensor. The hub transmits the signal from the at least one sensor to the main control unit. The main control unit regulates the RF transmission power of the at least one sensor necessary to communicate with the hub.

In a further aspect of any of the above, the system includes a plurality of sensors. At least one of the hub or the main control unit determines the RF transmission power necessary for each of the plurality of sensors to communicate with one of the hub or the main control unit.

In a further aspect of any of the above, the at least one sensor observes the communication parameters, path losses, and fading to regulate the RF transmission power of the at least one sensor.

In a further aspect of any of the above, the at least one sensor regulates its RF transmission power while communicating with at least one of the main control unit or a hub in communication with the main control unit.

In a further aspect of any of the above, the communication parameters include at least one of a received signal strength indication, a packet error rate, a bit error rate, an error vector magnitude, noise, packet delay or a signal to noise ratio.

In a further aspect of any of the above, the communication parameters are affected by at least one of a distance of the at least one sensor to the main control unit or path losses from the at least one sensor to the main control unit.

In a further aspect of any of the above, data related to the environment and the communication parameters is utilized to determine an optimum algorithm to regulate the RF transmission power of the at least one sensor.

In a further aspect of any of the above, the system includes a data device. The main control unit uploads data related to the environment and the communication parameters to the data device.

In a further aspect of any of the above, the algorithm is stored on at least one of the data device, the main control unit, or a hub in communication with the main control unit. The algorithm is dynamically updated based on the data.

In one aspect a method for adjusting the RF transmission power in a wireless sensor is provided. The method includes monitoring occurrences within an environment with at least one sensor positioned within the environment. The at least one sensor is in wireless communication with a main control unit. The method includes sending signals from the at least one sensor to the main control unit. The signals are indicative of the occurrences. The signals have communication parameters affected by an environmental condition of the environment. The method includes regulating, with the main control unit, a RF transmission power of the at least one sensor based on at least one of an aggregate of the communication parameters of the signal or the environmental condition.

In a further aspect of the above, the method includes transmitting the signal from the at least one sensor to a hub. The also includes transmitting the signal from the hub to the main control unit. The method also includes regulating, with the main control unit, the RF transmission power of the at least one sensor necessary to communicate with the hub.

In a further aspect of any of the above, the method includes determining, with at least one of the hub or the main control unit, the RF transmission power necessary for each of a plurality of sensors to communicate with one of the hub or the main control unit.

In a further aspect of any of the above, the method includes observing, with the at least one sensor, the communication parameters, path losses, and fading to regulate the RF transmission power of the at least one sensor.

In a further aspect of any of the above, the method includes regulating, with the at least one sensor, the RF transmission power of the at least one sensor while the at least one sensor communicates with at least one of the main control unit or a hub in communication with the main control unit.

In a further aspect of any of the above, the communication parameters include at least one of a received signal strength indication, a packet error rate, a bit error rate, an error vector magnitude, noise, packet delay or a signal to noise ratio.

In a further aspect of any of the above, the communication parameters are affected by at least one of a distance of the at least one sensor to the main control unit and path losses from the at least one sensor to the main control unit.

In a further aspect of any of the above, the method includes utilizing data related to the environment and the communication parameters to determine an optimum algorithm to regulate the RF transmission power of the at least one sensor.

In a further aspect of any of the above, the method includes uploading the data related to the environment and the communication parameters to a data device.

In a further aspect of any of the above, the method includes storing the algorithm on at least one of the data device, the main control unit, or a hub in communication with the main control unit. The method also includes dynamically updating the algorithm based on the data.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
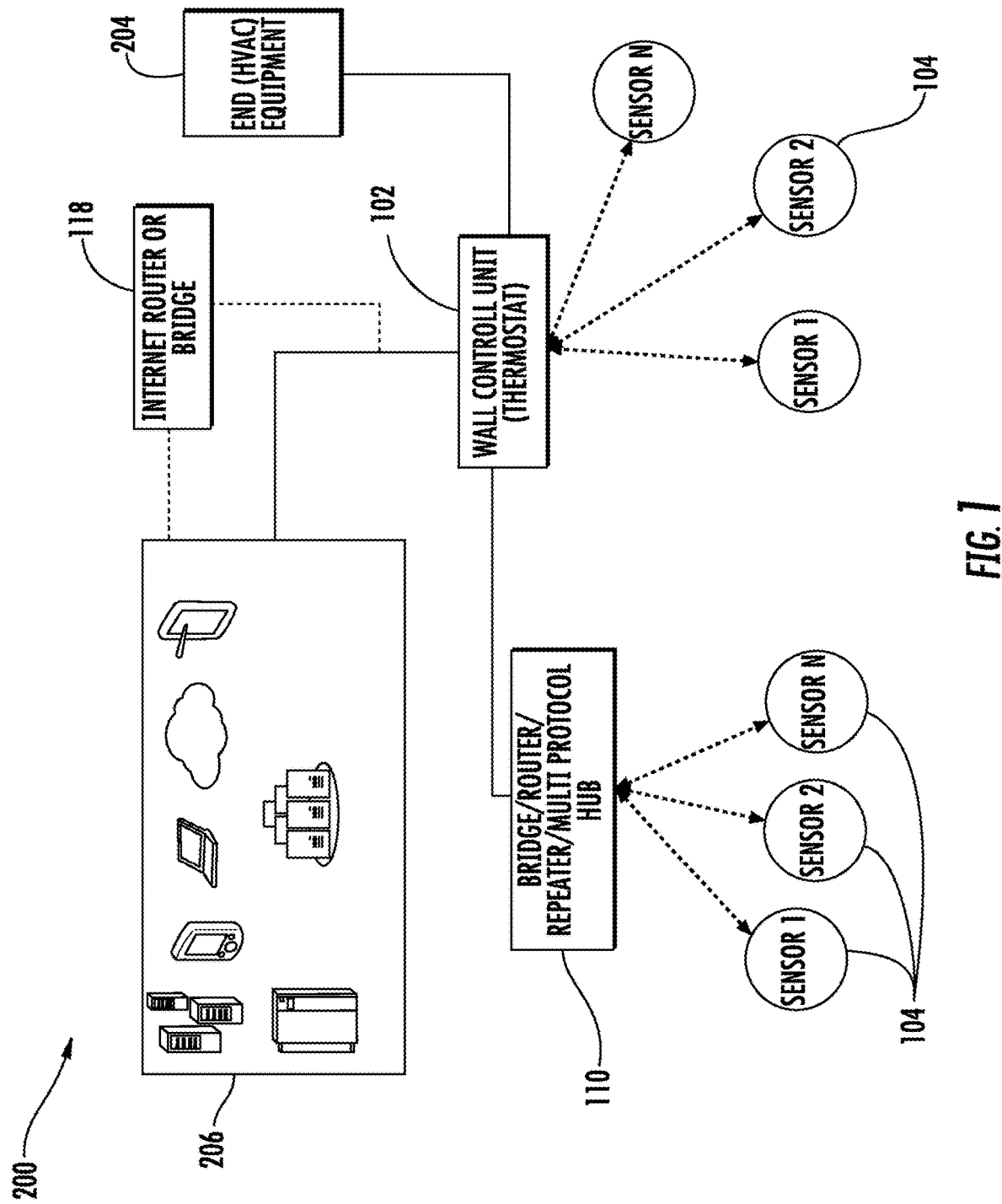
FIG. 1 is a schematic view of a system in accordance with an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a system 200 having a main control unit 102, a plurality of sensors 104, and at least one hub 110. In one embodiment, the system 200 includes more than one hub 110, and each of the plurality of sensors 104 may communicate with any one of the more than one hub 110. The system also includes an internet router or bridge 118 and end equipment 204. The main control unit 102 includes the algorithms to control the end equipment 204. In one embodiment, the end equipment 204 may be heating, ventilation and air conditioning (HVAC), security and/or other building devices. The plurality of sensors 104 may be configured to sense one or more occurrences, including, but not limited to, temperature, humidity, environmental gases, carbon monoxide, carbon dioxide, motion, glass break, door open, or security alarm, fire, occupancy, light, ultraviolet light, passive infrared, motion, water level, oxygen, volatile organic compounds, air flow, water flow, pressure, or sound, but are not limited to these occurrences.

The main control unit 102 may include interfaces to connect with data devices 206, such as a cloud, a mainframe, a datacenter, a server, or a mobile device, to name a few, such that data related to communication parameters of the signal of the sensor 104 may be uploaded. The communication parameters may include, but are not limited to, received signal strength indication (RSSI) level, packet error rates, bit error rate (BER), error vector magnitude (EVM), noise, packet delay and a signal to noise ratio. The data may be processed to identify the environmental condition the sensor 104 is operated in. Once the environmental condition is identified the main control unit 102 may download an algorithm to calculate the optimum RF transmission power level at which to program the sensor 104. The algorithm used to calculate optimum RF transmission power may updated based on research done in various environmental conditions, for example temperature, humidity, wooden construction, concrete construction, industrial environment, marine environment, geographical environments, seasonal environments, etc. The main control unit 102 may also learn about other interferences in the same communication bandwidth. The main control unit 102 may also have a user option to select a type of environmental condition for operation of the sensor 104.

In one embodiment, the data devices 206 store data related to various environmental conditions. Using this data, algorithms may be developed to set thresholds for sensor communication parameters, wherein the thresholds provide optimum RF transmission power levels for sensors 104 in such an environmental condition. In one embodiment, the algorithms may be unique to a protocol being utilized by the system 200. In one embodiment, the algorithms are dynamically updated based on various data received at the data devices 206. For example, the data devices 206 may receive various data from throughout the United States and/or worldwide.

In one embodiment, the main control unit 102 receives data about the environmental conditions of the system 200. In one embodiment, the main control unit 102 is equipped with sensors to monitor the environmental conditions. The environmental condition data may be transmitted to the data devices 206, where the data is compared to stored data to determine an optimum algorithm for programming the sensors 104 within a threshold. The main control unit 102 may then program the sensors 104 to operate at a RF transmission power level appropriate for the environmental condition. For example, based on the location of the sensor and environmental conditions, the main control unit 102 may transmit instructions to the sensor 104 to change the power level. As the environmental conditions change, the optimum RF power level of the sensors 104 may be adjusted based on the algorithms stored within the data devices 206 or the main control unit 102. In one embodiment, as described below with respect to FIGS. 6-9, the main control unit 102 may also assess the communication parameters of the signal being received from each sensor 104. Based on an aggregate of these communication parameters, each individual sensor 104 may be further programmed to an optimum RF transmission power level, as described below.

Figure 2:
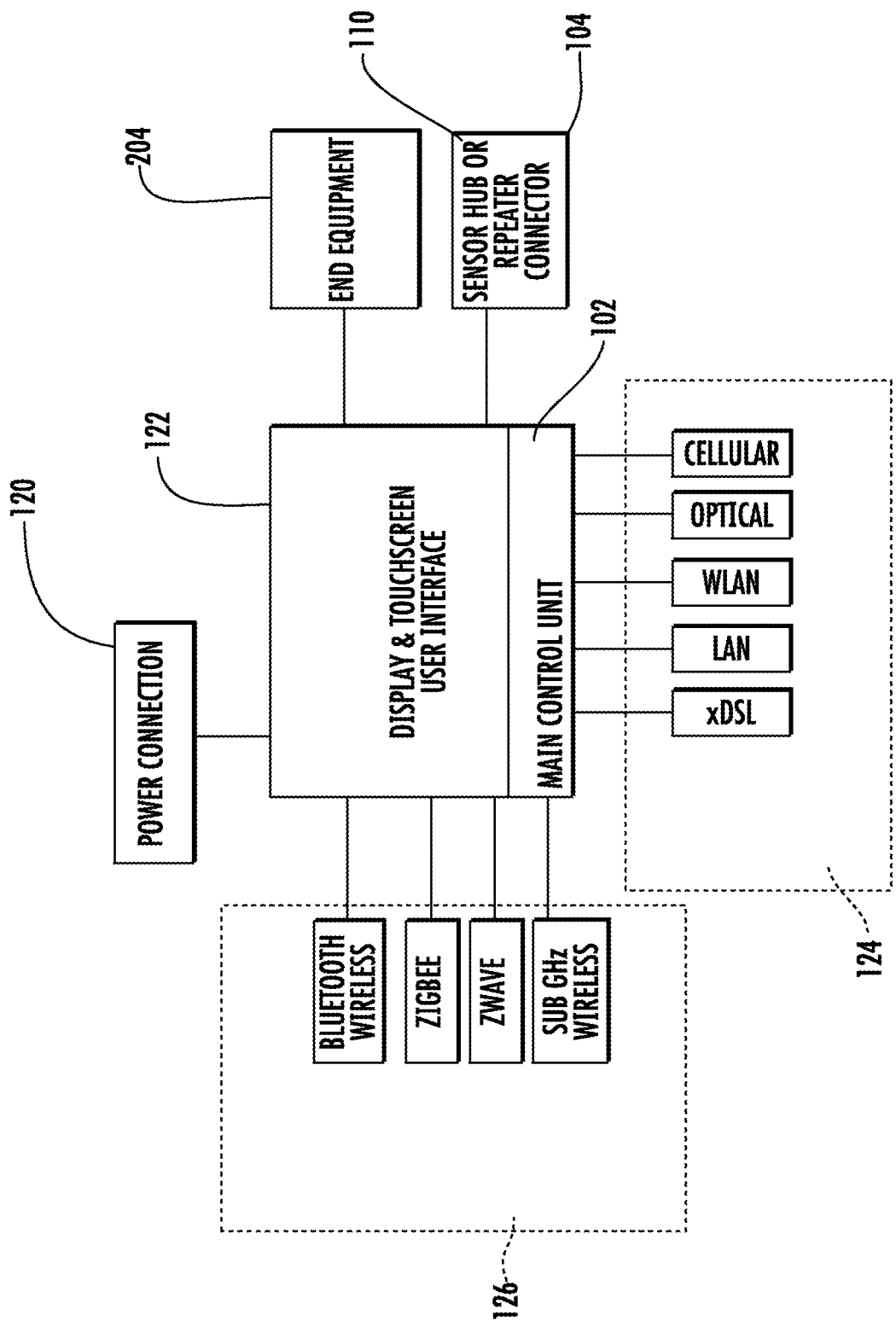
FIG. 2 is a schematic view of an input/output of the main control unit in accordance with an embodiment.

FIG. 2 illustrates an input/output view of the main control unit 102. The main control unit 102 is coupled to a power source 120. The main control unit 102 includes a user interface 122, which may be, in one embodiment, a display, a touch screen display, or the like. The user interface 122 may be configured so that a user may monitor the environmental conditions and/or the communication parameters of a signal transmitted from the sensor 104 to the main control unit 102. The main control unit 102 is coupled via a wired or wireless link to end equipment 204. The hub 110 and/or the sensors 104 are wirelessly coupled to the main control unit 102. An internet user connectivity interface 124 links the main control unit 102 to at least one of the internet and/or a cloud based server. The interface 124 may include a DSL, LAN, WLAN, optical, or cellular connection, or the like. Communication devices 126 to communicate with the sensors 104 may be provided in the form of BLUETOOTH®, ZIGBEE®, ZWAVE®, 6LOWPAN®, HaLow®, 802.15.4 any Industrial, Scientific, and Medical ("ISM") band of frequencies or any other standard or proprietary protocol in ISM band of radio frequencies and TV unused or TV white space. The communication devices 126 enable the main control unit 102 to wirelessly share data received from the sensors 104 and related to the environmental conditions and/or the communication parameters of the signal from the sensor 104 with a mobile device, a remote computer, or the like.

Figure 3:
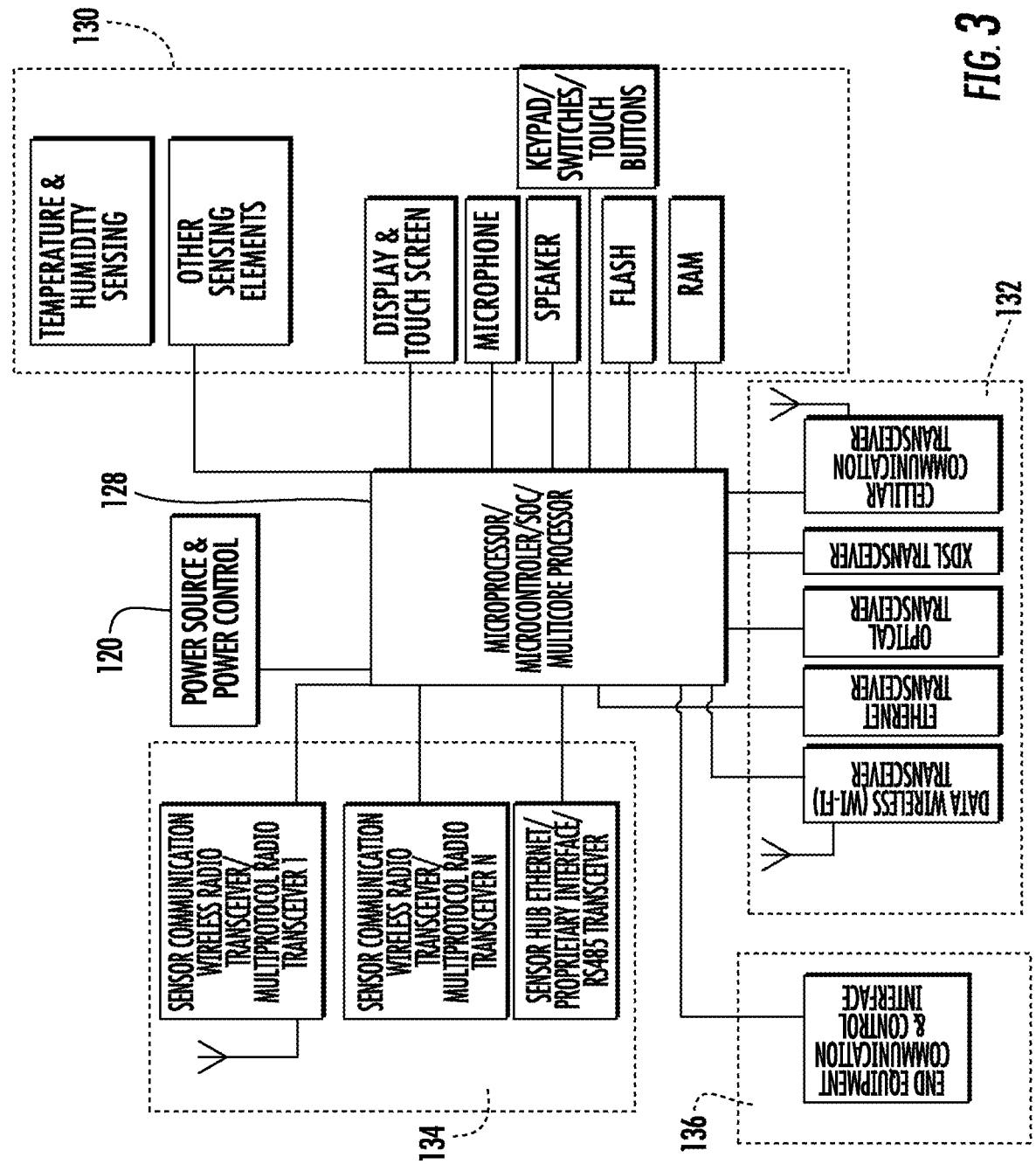
FIG. 3 is a schematic view of the internal configuration of the main control unit in accordance with an embodiment.

FIG. 3 illustrates the internal configuration of the main control unit 102. The main control unit 102 includes a processor 128. In one embodiment, the processor 128 may be a microprocessor, a microcontroller, an SOC, a multicore processor, or the like. Interfaces 130 are provided on the user interface 122. The interfaces 130 may include, but are not limited to, sensing elements, a display screen, a microphone, a speaker, a keypad, touch buttons, a flash drive, or random access memory. External communication interfaces 132 are provided that may include, but are not limited to, wired and/or wireless receivers and transceivers. Sensor communication interfaces 134 are provided to communicate wirelessly with the sensors 104 and/or hub 110. In one embodiment, the interfaces 134 include wireless radio transceivers and/or receivers. In one embodiment, the interfaces 134 include Ethernet hubs and interfaces. In one embodiment, a communication control and interface 136 is provided to communicate with the end equipment 204. In one embodiment, the main control 102 may have multiple radios to support different protocol sensors at same time. Each protocol may require an exclusive algorithm to regulate the RF transmission power.

Figure 4:
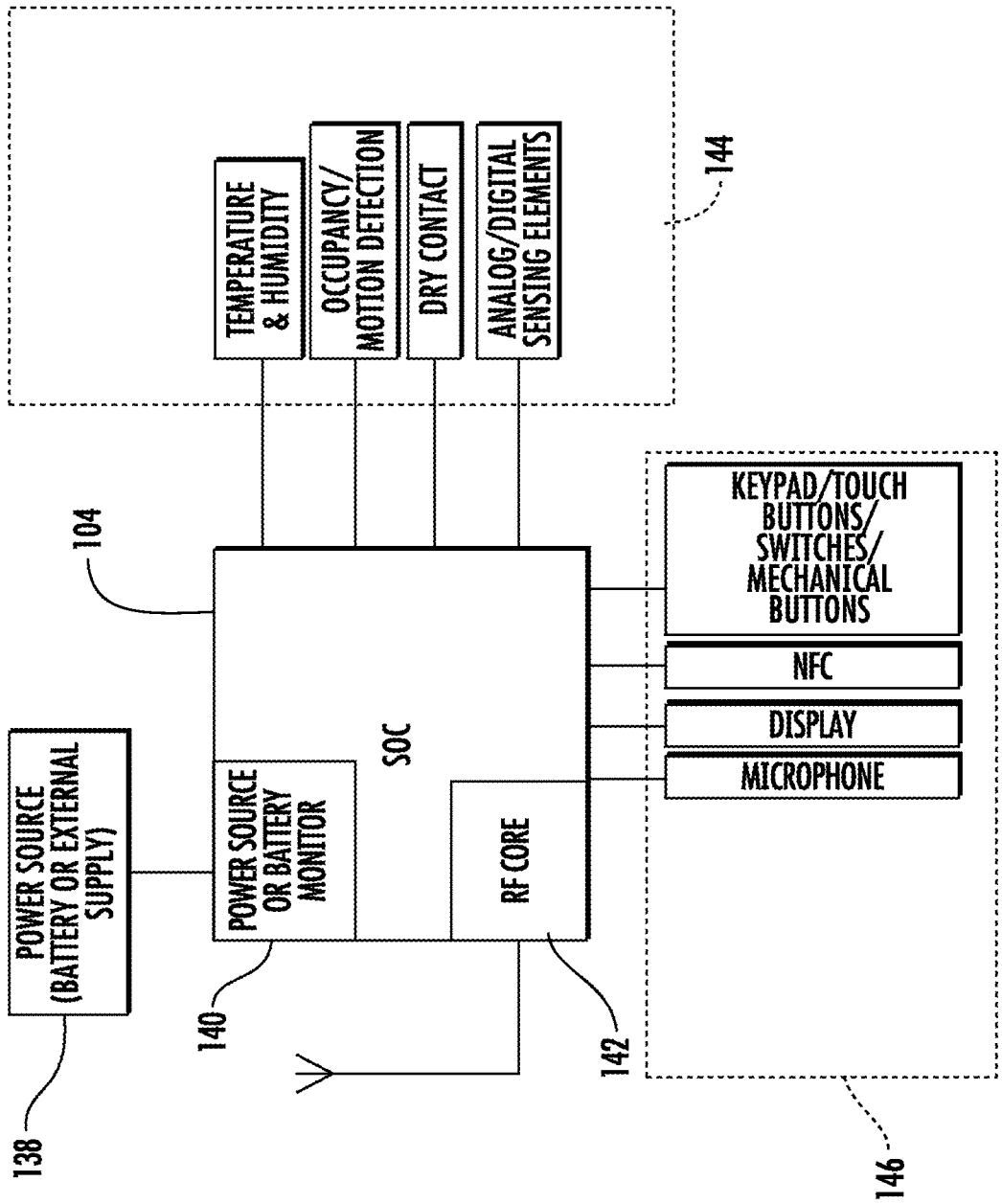
FIG. 4 is a schematic view of the internal configuration of the sensor in accordance with an embodiment.

FIG. 4 illustrates the internal configuration of the sensor 104. The sensor 104 includes at least one sensing element 144. The sensor 104 may include an external power source 138 and/or an internal power source 140. In one embodiment, the sensing element 144 may be a dry contact, analog or digital sensing element. In one embodiment, the sensing element 144 may be configured to sense any one of, but not limited to, temperature, humidity, environmental gases, carbon monoxide, carbon dioxide, motion, glass break, door open, or security alarm, fire, occupancy, light, ultraviolet light, passive infrared, motion, water level, oxygen, volatile organic compounds, air flow, water flow, pressure, or sound. The sensor 104 further includes a radio-frequency core 142 to transmit and receive signals with the main control unit 102 and/or a hub 110. A user interface 146 is provided that may include a keypad, touch buttons, switches, mechanical buttons, a display, a microphone, or near field communication to name a few non-limiting examples.

Figure 5:
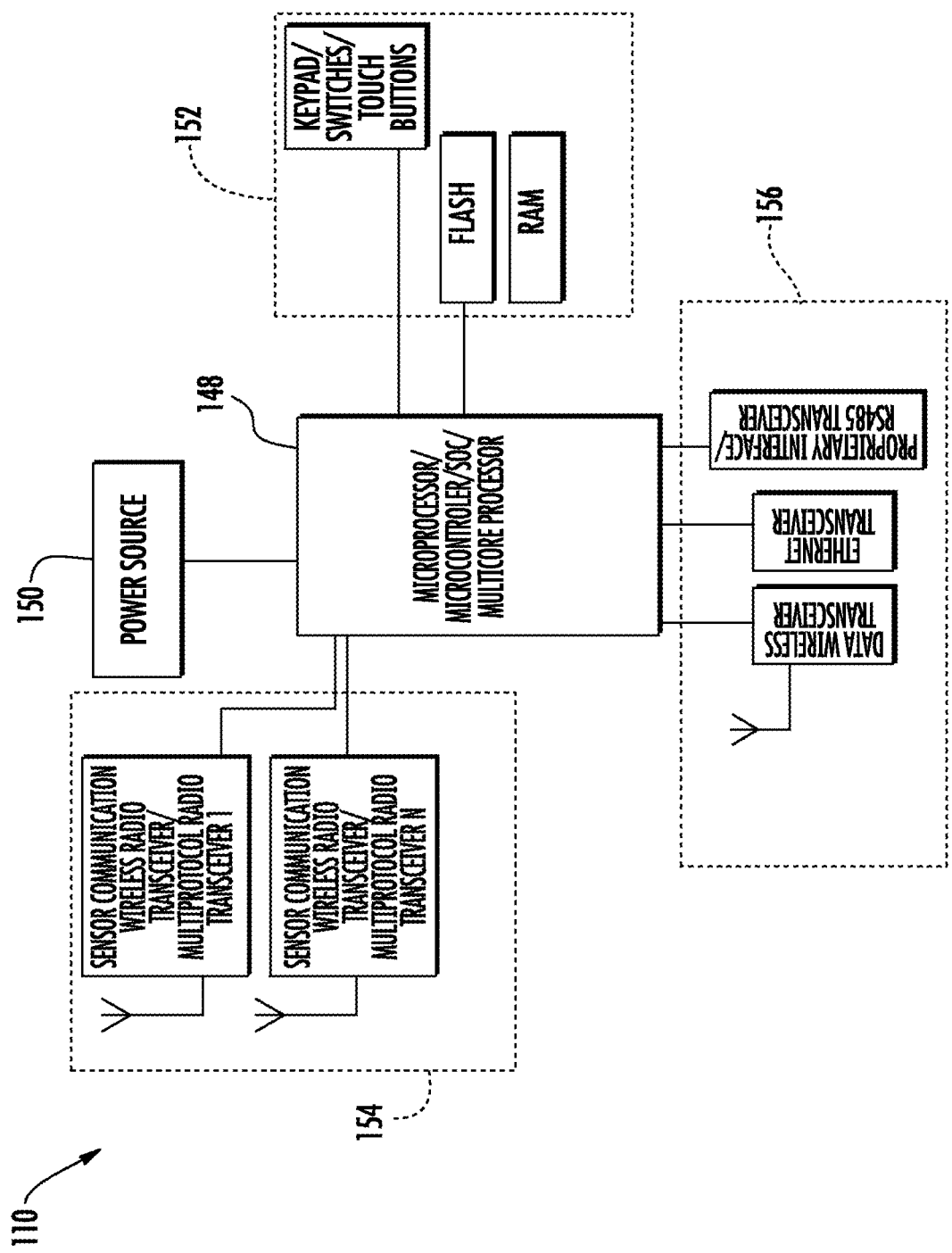
FIG. 5 is a schematic view of the internal configuration of the hub in accordance with an embodiment.

FIG. 5 illustrates the internal configuration of the hub 110. The hub 110 includes a processor 148. In one embodiment, the processor 148 may be a microprocessor, a microcontroller, a SOC, a multicore processor, or the like. A power source 150 is provided. The power source 150 may be an external or internal power source. Interfaces 152 are provided and may include, but are not limited to, sensing elements, a display screen, a microphone, a speaker, a keypad, touch buttons, a flash drive, or random access memory. Sensor communication interfaces 154 that communicate with the sensors 104 may include wired and/or wireless receivers and transceivers. A communication interface 156 is provided to communicate with the main control unit 102. The interface 156 may include wired and/or wireless receivers and transceivers or Ethernet transceivers and receivers.

Figure 6:
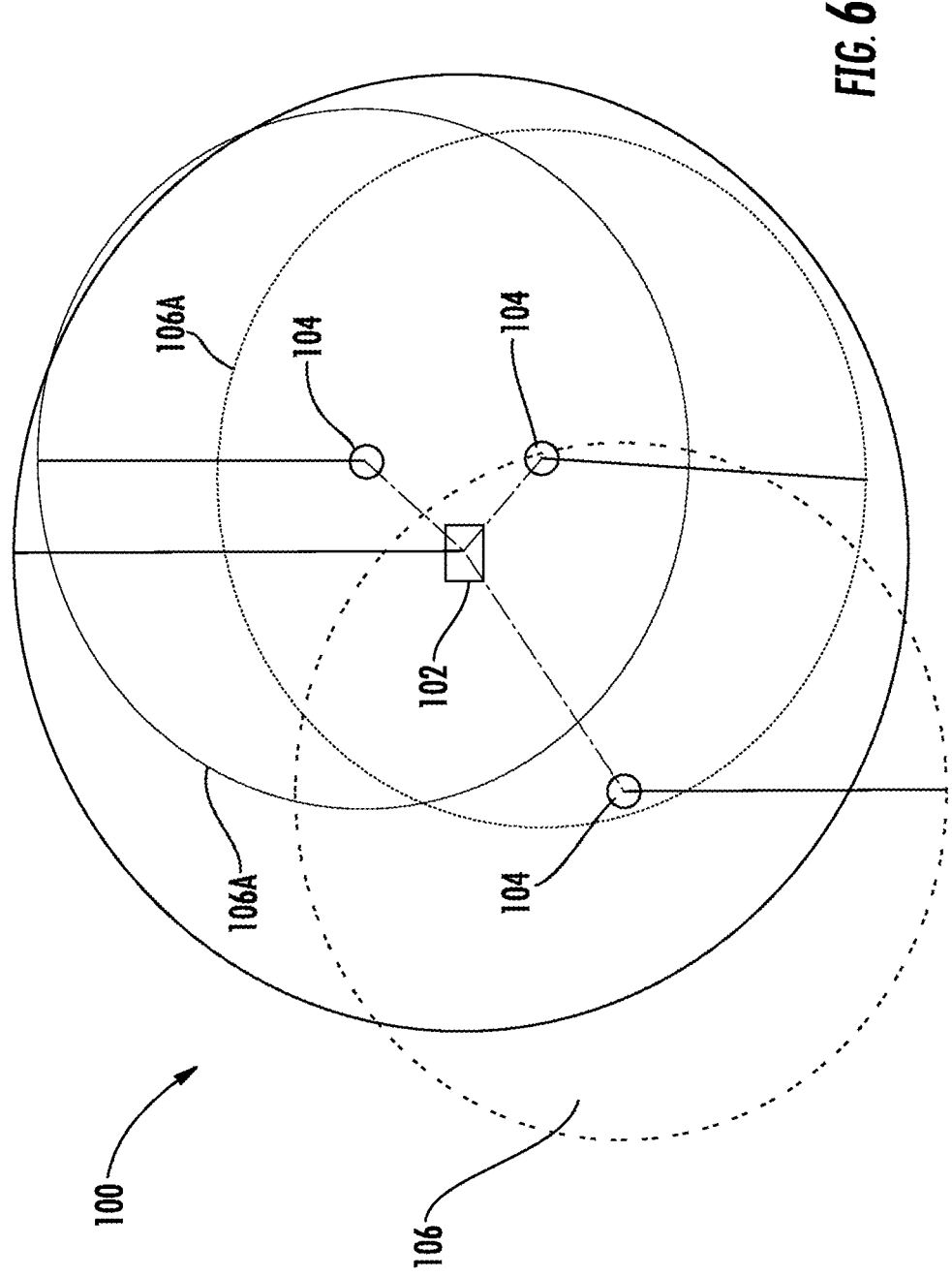
FIG. 6 is a diagram of a system in accordance with an embodiment having a plurality of sensors that communicate with a main control unit.
Figure 7:
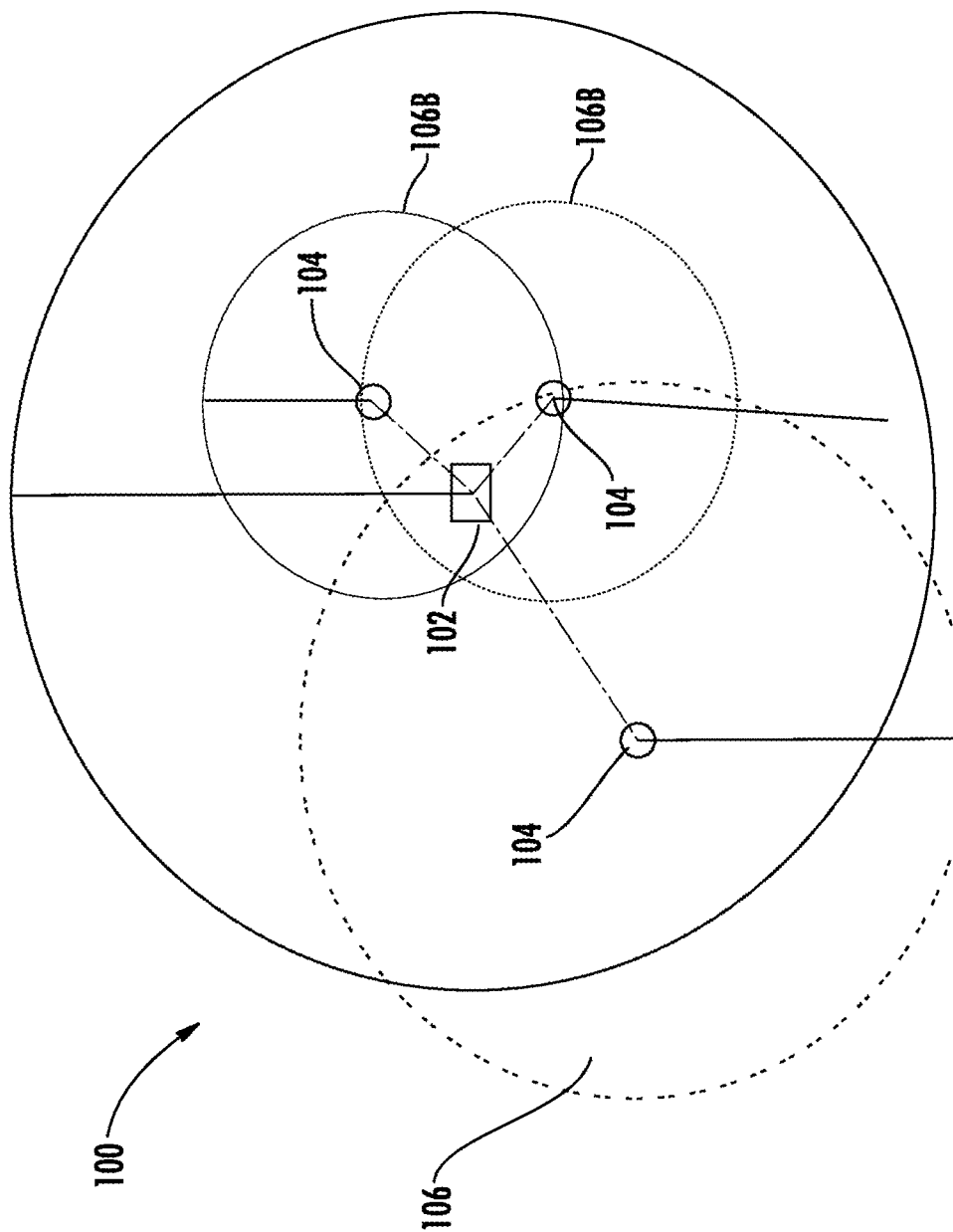
FIG. 7 is a diagram of a system in accordance with an embodiment having a plurality of sensors that communicate with a main control unit, wherein the main control unit adjusts the power of the sensors.

FIGS. 6 and 7 illustrate a system 100 for adjusting the RF transmission power of a sensor. The system 100 includes the main control unit 102. The system 100 also includes at least one sensor 104 positioned within the environment and constructed and arranged to monitor occurrences within the environment. The at least one sensor 104 sends signals to the main control unit 102 indicative of occurrences. The signals travel throughout the environment in a radio-frequency (RF) transmission field 106.

As seen in FIG. 6, a plurality of sensors 104 are operated at full RF transmission power, such that the RF transmission field 106A may expand past the main control unit 102. The main control unit 102 may sense the communication parameters of the signal from the at least one sensor 104 for a particular channel for a time interval. These communication parameters may be affected by a distance of the at least one sensor 104 to the main control unit 102. For example, the further the at least one sensor 104 is from the main control unit 102, the weaker the signal received at the main control unit 102 may be. Additionally, the communication parameters may also be affected by path losses or fading from the at least one sensor 104 to the main control unit 102. For example, walls or other obstructions in the environment may affect the communication parameters.

The main control unit 102 may then estimate an optimum RF transmission power level required by the at least one sensor 104 to transmit its message to the main control unit 102. In one embodiment, the main control unit 102 may estimate the optimum RF transmission power level based on one of a plurality of communication parameters of the signal from the sensor 104. In one embodiment, the main control unit 102 may estimate the optimum RF transmission power level based on a totality of a plurality of communication parameters. In one embodiment, the main control unit 102 may estimate the optimum RF transmission power level based on the environmental conditions. In one embodiment, the optimum RF transmission power level is determined when the system 100 is turned on. In one embodiment, the optimum RF transmission power level is determined when the at least one sensor 104 goes offline from the system 100. In one embodiment, the optimum RF transmission power level is determined dynamically in real-time.

In one embodiment, the main control unit 102 sends a signal to the at least one sensor 104 to regulate a RF transmission power consumption of the at least one sensor 104 based on the optimum RF transmission power level. As seen in FIG. 7, the main control unit 102 may control the least one sensor 104 to operate at the optimum RF transmission power level such that the RF transmission field 106B no longer expands past the main control unit 102, but rather, expands only as far as necessary to reach the main control unit 102. The RF transmission power required by the at least one sensor 104 to reach the main control unit 102 may be less than the full RF transmission power of the at least one sensor 104. As such, RF transmission power consumption by the at least one sensor 104 may be optimized and reduced to improve a battery life of the at least one sensor 104.

In one example, if the sensor 104 is initially installed in a vacant building, a first RF transmission power level for the sensors 104 may be determined. As the building becomes occupied, the RF transmission power level of the sensor 104 may be altered due to path losses and fading. In one embodiment, the RF transmission power level of the sensor 104 may be dependent on the materials of the building. The main control unit 102 will host acquire algorithms to calculate the optimum RF transmission power level from the data devices 206. These algorithms will consider the sensed communication parameters and will calculate the optimum RF transmission power level for the sensor 104. The algorithms may be updated with ongoing research activities, in one embodiment.

In one embodiment, the remote sensor 104 may learn the optimum RF transmission power level to transmit to the main control unit 102. The remote sensor 104 may then send the beacon packets while varying transmit RF transmission power level. On the successful acknowledgement from the main control unit 102, the remote sensor 104 will observe the communication parameters, path losses and fading and will then decide on the optimum RF transmission power to communicate at and then configure its own RF transmission power level. In one embodiment, the remote sensor 104 may observe normal communication messages, matriculate communication parameters, and then decide upon optimum RF transmission power level to configure itself.

Figure 8:
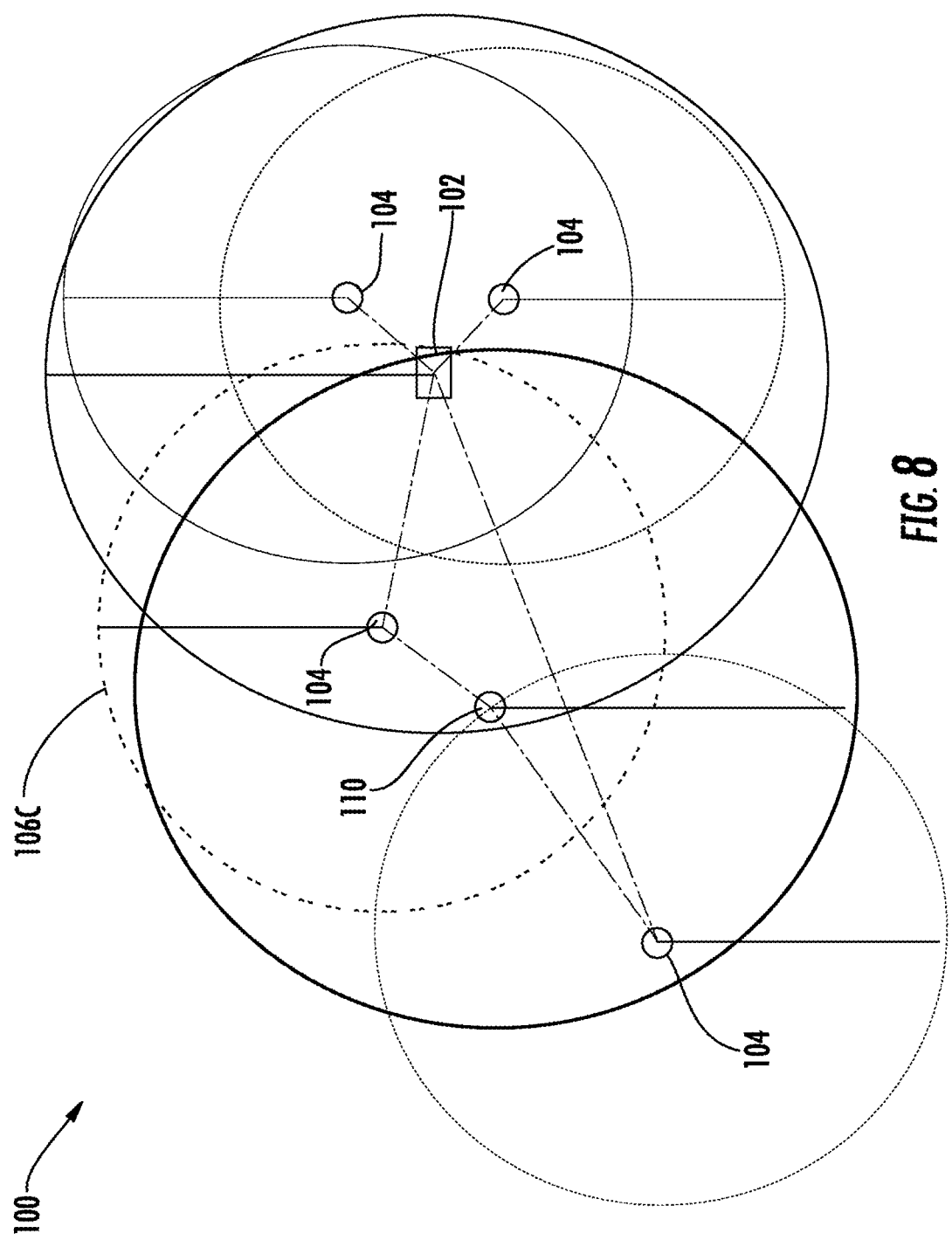
FIG. 8 is a diagram of a system in accordance with an embodiment having a plurality of sensors that communicate with a main control unit through a hub.
Figure 9:
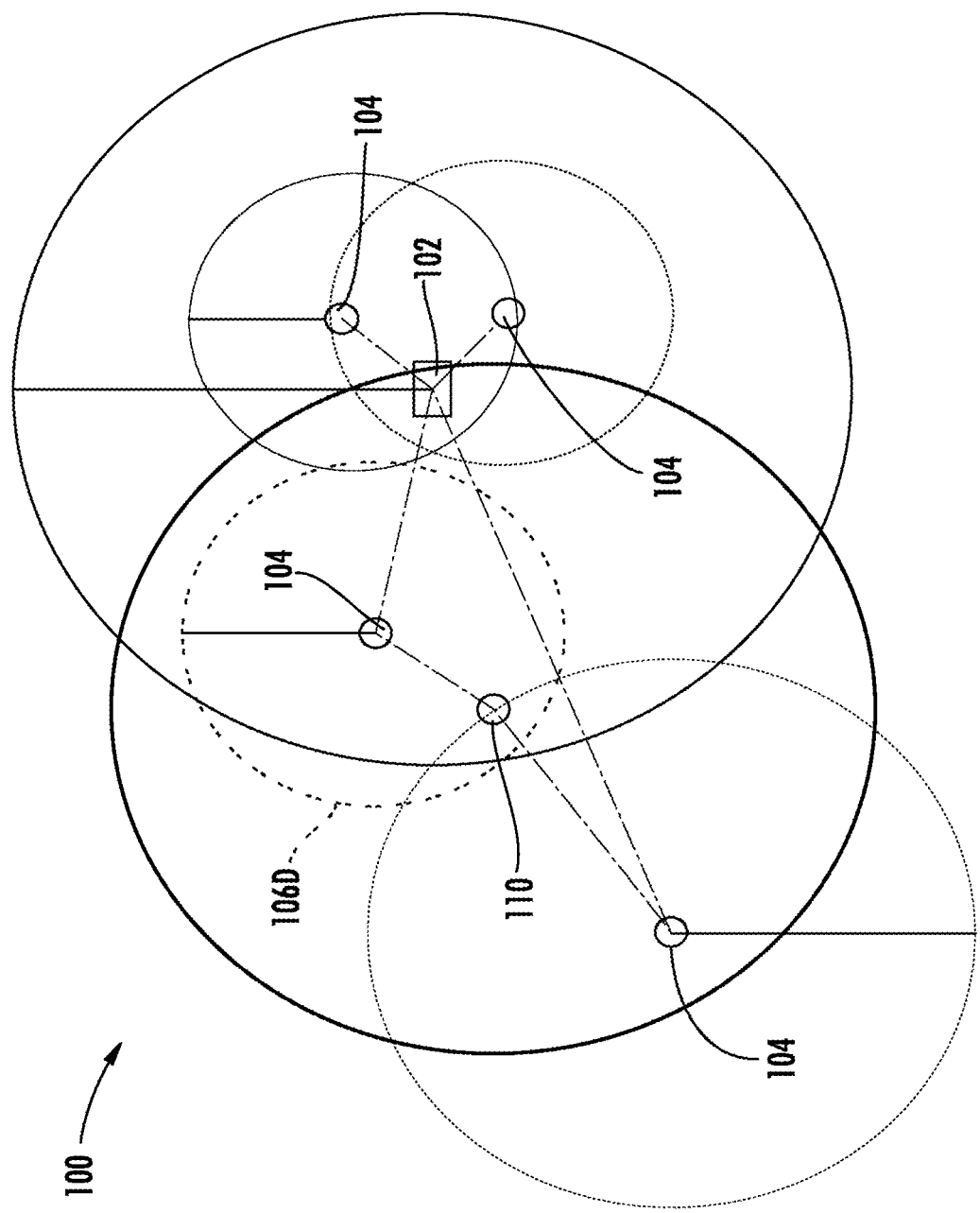
FIG. 9 is a diagram of a system in accordance with an embodiment having a plurality of sensors that communicate with a main control unit through a hub, wherein the main control unit adjusts the power of the sensors.

In the embodiment shown in FIGS. 8 and 9, if the main control unit 102 is not in the range of the sensor 104, a hub 110 may be used as a bridge between the main control unit 102 and the at least one sensor 104. In one embodiment, the hub 110 may be a repeater, range extender, aggregator or protocol conversion device, a distributor, or the like. In one embodiment, at least one sensor 104 may operate as a hub 110 for other sensors 104. In one embodiment, the hub 110 and the main control unit 102 may communicate via a wired or wireless connection.

FIG. 8 illustrates the at least one sensor 104 generating an RF transmission field 106C that expands beyond the hub 110. In such a scenario, the hub 110 may determine the optimum RF transmission power level to transmit signals from the at least one sensor 104 to the main control unit 102 or the hub 110. The hub 110 may send beacon packets while varying a transmit RF transmission power level. On the beacon packets being received by the at least one sensor 104, the hub 110 may observe the communication parameters, path losses and fading of the signal from the at least one sensor 104. The hub 110 may then decide on the optimum RF transmission power required to communicate and then configure its own RF transmission power level. The main control unit 102 may then regulate the RF transmission power consumption of the at least one sensor 104 so that an RF transmission field 106D (as shown in FIG. 9) is optimized to reach the hub 110, but not to expand beyond the hub 110.

In one embodiment, the remote sensor 104 may learn the optimum RF transmission power level to transmit to the main control unit 102 or the hub 110. The remote sensor 104 may then send the beacon packets while varying transmit RF transmission power level. On the successful acknowledgement from the main control unit 102 or the hub 110, the remote sensor 104 will observe the communication parameters, path losses and fading and will then decide on the optimum RF transmission power to communicate at and then configure its own RF transmission power level.

The embodiments described herein may improve the battery life of the sensors in the system and optimize the communication network between the sensors and main control unit. Additionally, the embodiments described herein provide secure communication between the sensors and the main control unit so that no intrusion into a communication system is created as the sensor field is configured to optimum communication parameters.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A system for RF transmission power adjustment in a wireless sensor, comprising:
   a main control unit positioned within an environment; and
   at least one sensor positioned within the environment and constructed and arranged to monitor occurrences within the environment, wherein the at least one sensor is in wireless communication with the main control unit, wherein the at least one sensor sends signals to the main control unit indicative of the occurrences, the signals having communication parameters affected by an environmental condition of the environment, wherein the main control unit regulates a RF transmission power of the at least one sensor based on at least one of an aggregate of the communication parameters of the signal or the environmental condition;
   wherein data related to the environment and the communication parameters is utilized to determine an algorithm to regulate the RF transmission power of the at least one sensor.

2. The system of claim 1, further comprising a hub to receive the signal from the at least one sensor, the hub transmitting the signal from the at least one sensor to the main control unit, the main control unit regulating the RF transmission power of the at least one sensor necessary to communicate with the hub.

3. The system of claim 2 further comprising a plurality of sensors, wherein at least one of the hub or the main control unit determines the RF transmission power necessary for each of the plurality of sensors to communicate with one of the hub or the main control unit.

4. The system of claim 1, wherein the at least one sensor observes the communication parameters, path losses, and fading to regulate the RF transmission power of the at least one sensor.

5. The system of claim 4, wherein the at least one sensor regulates its RF transmission power while the at least one sensor communicates with at least one of the main control unit or a hub in communication with the main control unit.

6. The system of claim 1, wherein the communication parameters include at least one of a received signal strength indication, a packet error rate, a bit error rate, an error vector magnitude, noise, packet delay or a signal to noise ratio.

7. The system of claim 1, wherein the communication parameters are affected by at least one of a distance of the at least one sensor to the main control unit or path losses from the at least one sensor to the main control unit.

8. The system of claim 1 further comprising a data device, wherein the main control unit uploads data related to the environment and the communication parameters to the data device.

9. The system of claim 8, wherein the algorithm is stored on at least one of the data device, the main control unit, or a hub in communication with the main control unit, wherein the algorithm is dynamically updated based on the data.

10. A method for adjusting the RF transmission power in a wireless sensor, comprising:
    monitoring occurrences within an environment with at least one sensor positioned within the environment, wherein the at least one sensor is in wireless communication with a main control unit;
    sending signals from the at least one sensor to the main control unit, wherein the signals are indicative of the occurrences, the signals having communication parameters affected by an environmental condition of the environment;
    regulating, with the main control unit, a RF transmission power of the at least one sensor based on at least one of an aggregate of the communication parameters of the signal or the environmental condition;
    utilizing data related to the environment and the communication parameters to determine an algorithm to regulate the RE transmission power of the at least one sensor.

11. The method of claim 10, further comprising:
    transmitting the signal from the at least one sensor to a hub;
    transmitting the signal from the hub to the main control unit; and
    regulating, with the main control unit, the RF transmission power of the at least one sensor necessary to communicate with the hub.

12. The method of claim 11, wherein the method further comprises determining, with at least one of the hub or the main control unit, the RF transmission power necessary for each of a plurality of sensors to communicate with one of the hub or the main control unit.

13. The method of claim 10 further comprising observing, with the at least one sensor, the communication parameters, path losses, and fading to regulate the RF transmission power of the at least one sensor.

14. The method of claim 13, further comprising regulating, with the at least one sensor, the RF transmission power of the at least one sensor while the at least one sensor communicates with at least one of the main control unit or a hub in communication with the main control unit.

15. The method of claim 10, wherein the communication parameters include at least one of a received signal strength indication, a packet error rate, a bit error rate, an error vector magnitude, noise, packet delay or a signal to noise ratio.

16. The method of claim 10, wherein the communication parameters are affected by at least one of a distance of the at least one sensor to the main control unit and path losses from the at least one sensor to the main control unit.

17. The method of claim 10 further comprising uploading the data related to the environment and the communication parameters to a data device.

18. The method of claim 17 further comprising:
    storing the algorithm on at least one of the data device, the main control unit, or a hub in communication with the main control unit; and
    dynamically updating the algorithm based on the data.

* * * * *